United States Patent
Boyle

(10) Patent No.: US 10,881,958 B2
(45) Date of Patent: Jan. 5, 2021

(54) INTERACTIVE GAME FLOOR SYSTEM AND METHOD

(71) Applicant: Universal City Studios LLC, Universal City, CA (US)

(72) Inventor: Patrick Devin Boyle, Orlando, FL (US)

(73) Assignee: Universal Studios LLC, Universal City, CA (US)

( * ) Notice: Subject to any disclaimer, the term of this patent is extended or adjusted under 35 U.S.C. 154(b) by 0 days.

(21) Appl. No.: 15/937,491

(22) Filed: Mar. 27, 2018

(65) Prior Publication Data

US 2018/0214774 A1 Aug. 2, 2018

Related U.S. Application Data

(63) Continuation of application No. 14/305,793, filed on Jun. 16, 2014, now Pat. No. 9,943,759.

(51) Int. Cl.
*A63F 13/55* (2014.01)
*A63F 13/90* (2014.01)
*A63G 25/00* (2006.01)

(52) U.S. Cl.
CPC .............. *A63F 13/55* (2014.09); *A63F 13/90* (2014.09); *A63G 25/00* (2013.01)

(58) Field of Classification Search
CPC ........ A63G 25/00; G09B 19/167; A63F 13/55
See application file for complete search history.

(56) References Cited

U.S. PATENT DOCUMENTS

| | | |
|---|---|---|
| 4,324,301 A | 4/1982 | Everly |
| 5,251,910 A | 10/1993 | Lamanna |
| 5,435,553 A | 7/1995 | Arima et al. |
| 5,577,736 A | 11/1996 | Arabo |
| 5,716,281 A | 2/1998 | Dote |
| 5,906,542 A | 5/1999 | Neumann |

(Continued)

FOREIGN PATENT DOCUMENTS

| | | |
|---|---|---|
| CN | 101954191 | 1/2001 |
| CN | 201042620 | 4/2008 |

(Continued)

OTHER PUBLICATIONS

PCT/US2015/035839 Invitation to Pay Additional Fee dated Oct. 13, 2015.

(Continued)

*Primary Examiner* — David L Lewis
*Assistant Examiner* — Robert E Mosser
(74) *Attorney, Agent, or Firm* — Fletcher Yoder P.C.

(57) ABSTRACT

A system in accordance with present embodiments includes a surface that displays a plurality of images related to a game, a vehicle comprising interface circuitry configured to receive an input from the rider related to a vehicle path on the surface, wherein the vehicle operates according to the input to move on the surface on the vehicle path, and a controller that determines that the vehicle has moved over a first image of the plurality of images while on the vehicle path based on a signal from the vehicle, the surface, an external sensor, or a combination thereof; provides instructions to display circuitry associated with the surface to change the first image when the vehicle has moved over the first image while on the vehicle path; and updates a score associated with the vehicle when the vehicle has moved over the first image while on the vehicle path.

16 Claims, 6 Drawing Sheets

(56) References Cited

U.S. PATENT DOCUMENTS

| | | |
|---|---|---|
| 6,431,036 B1 | 8/2002 | Obermeier |
| 6,463,859 B1 | 10/2002 | Ikezawa et al. |
| 6,761,634 B1 | 7/2004 | Peterson et al. |
| 7,607,500 B2 | 10/2009 | Sweringen et al. |
| 7,775,883 B2 | 8/2010 | Smoot et al. |
| 8,033,346 B2 | 10/2011 | Kessler |
| 9,364,757 B2 | 6/2016 | Miyamoto et al. |
| 2003/0153374 A1 | 8/2003 | Gilmore |
| 2007/0060229 A1 | 3/2007 | Okada et al. |
| 2009/0005196 A1 | 1/2009 | Kessler et al. |
| 2009/0125161 A1 | 5/2009 | Baur et al. |

FOREIGN PATENT DOCUMENTS

| | | |
|---|---|---|
| JP | S63244116 | 10/1988 |
| JP | H05123454 | 5/1993 |
| JP | H09173634 | 7/1997 |
| JP | 5228264 | 7/2013 |
| JP | 2013244036 | 12/2013 |
| KR | 20050047176 | 5/2005 |
| RU | 2130797 C1 | 5/1999 |

OTHER PUBLICATIONS

JP 2016-573894 Decision of Grant dated Jun. 4, 2018.
Russian Decision to Grant for RU Application No. 2017101087 dated Aug. 1, 2018; 12 Pages.
JP 2018-127409 Office Action dated Jun. 3, 2019.
EP 19190306.1 European Search Report dated Oct. 22, 2019.

INTERACTIVE GAME FLOOR SYSTEM AND METHOD

CROSS-REFERENCE TO RELATED APPLICATION

This application is a continuation of U.S. patent application Ser. No. 14/305,793 entitled "INTERACTIVE GAME FLOOR SYSTEM AND METHOD," filed on Jun. 16, 2014, which is herein incorporated by reference in its entirety.

FIELD OF DISCLOSURE

The present disclosure relates generally to the field of amusement parks. More specifically, embodiments of the present disclosure relate to methods and equipment used in conjunction with amusement park games or rides.

BACKGROUND

Since the early twentieth century, amusement parks (or theme parks) have substantially grown in popularity. Ride attractions having vehicles, such as cars or bumper cars, have long been popular. In bumper cars, vehicle riders attempt to "bump" into other vehicles. The vehicles may be powered via a power source in the ceiling and move within an arena. The vehicles may be painted or patterned according to a particular theme, and may be able to accommodate one or more riders. With the increasing sophistication and complexity of modern ride attractions, and the corresponding increase in expectations among theme or amusement park patrons, improved and more creative ride attractions are needed, including ride attractions having more complex vehicle movement and features.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes a surface configured to display a plurality of images related to a game. The system also includes a vehicle configured to accommodate a rider and comprising interface circuitry configured to receive an input from the rider related to a vehicle path on the surface, wherein the vehicle operates according to the input to move on the surface on the vehicle path. Further, the system includes a controller configured to determine that the vehicle has moved over a first image of the plurality of images while on the vehicle path based on a signal from the vehicle, the surface, an external sensor, or a combination thereof; provide instructions to display circuitry associated with the surface to change the first image when the vehicle has moved over the first image while on the vehicle path; and update a score associated with the vehicle when the vehicle has moved over the first image while on the vehicle path.

In another embodiment, a method includes receiving one or more signals related to a plurality of vehicle positions for a plurality of vehicles. The method also includes assigning a first group of scores to a first subset of the plurality of vehicles based on the vehicle positions of the first subset relative to a floor surface. Further, the method includes assigning a second group of scores to a second subset of the plurality of vehicles based on a location of respective vehicles of the second subset relative to respective vehicles of the first subset.

In another embodiment, a controller includes a memory. The memory stores instructions that when executed, are configured to access a first game display; provide instructions to display circuitry of a game floor surface to display the first game display, wherein the first game display comprises a first game configuration and a first set of displayed images; receive one or more signals indicative of movement of individual vehicles on the game floor; and assign scores to the vehicles based on the movement and the first game configuration. The controller further includes a processor configured to execute the instructions.

DRAWINGS

These and other features, aspects, and advantages of the present disclosure will become better understood when the following detailed description is read with reference to the accompanying drawings in which like characters represent like parts throughout the drawings, wherein.

Figure 6:
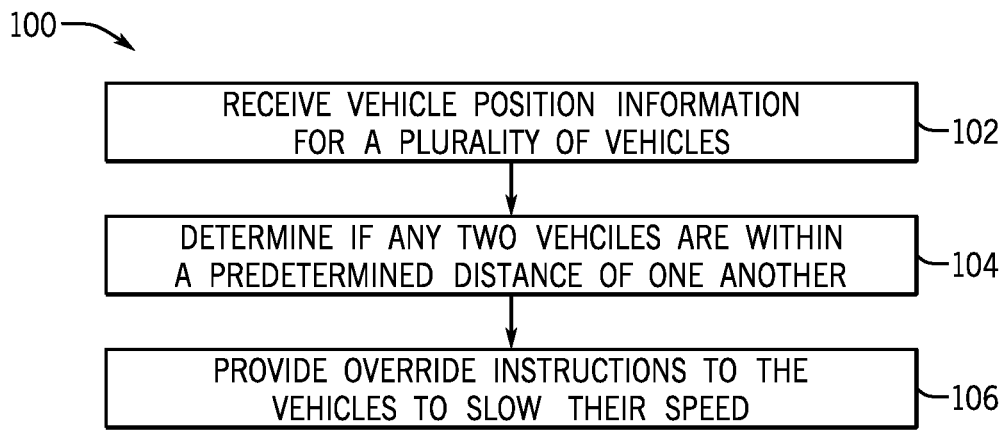
Figure 8:
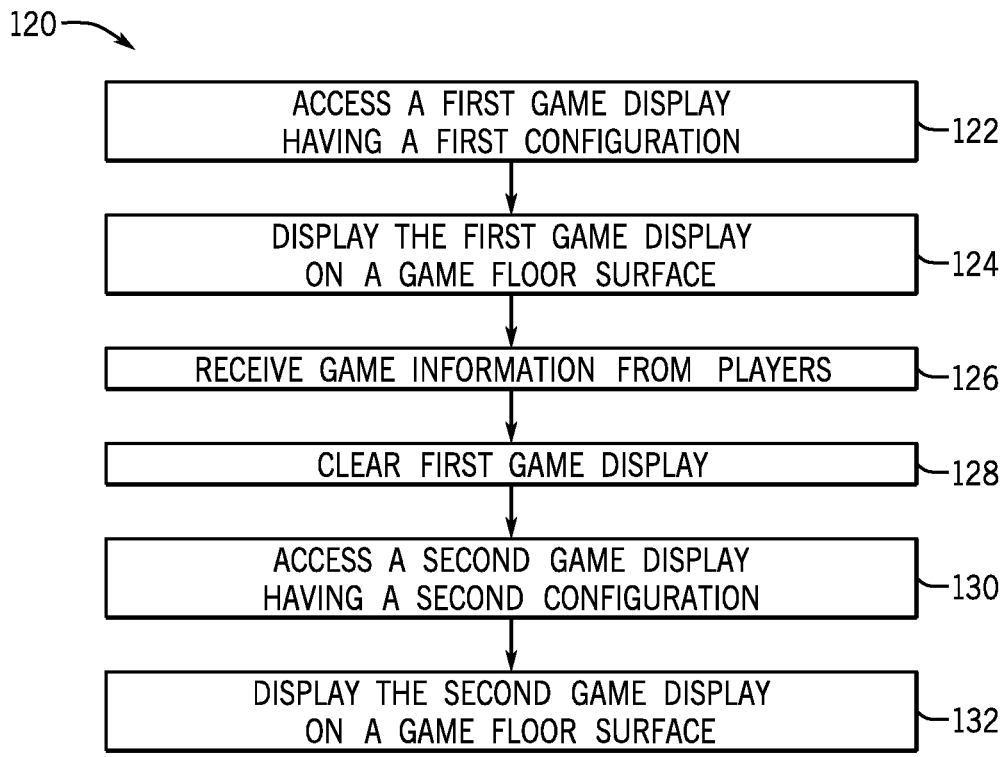
Figure 7:
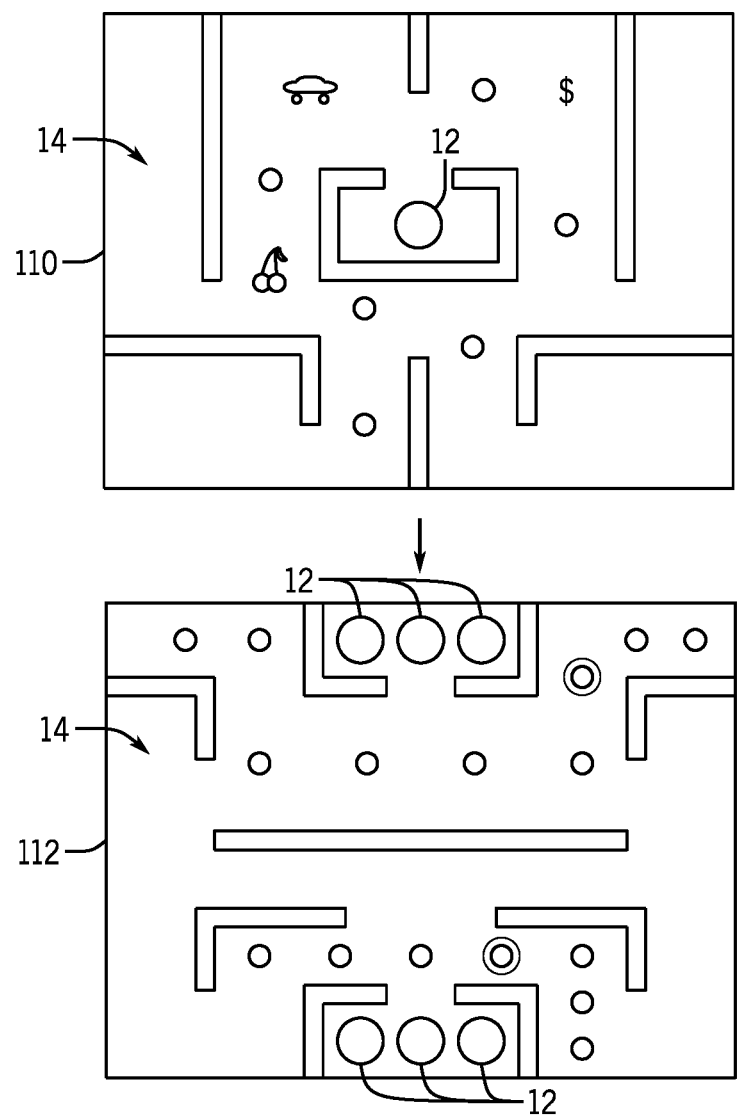
Figure 9:
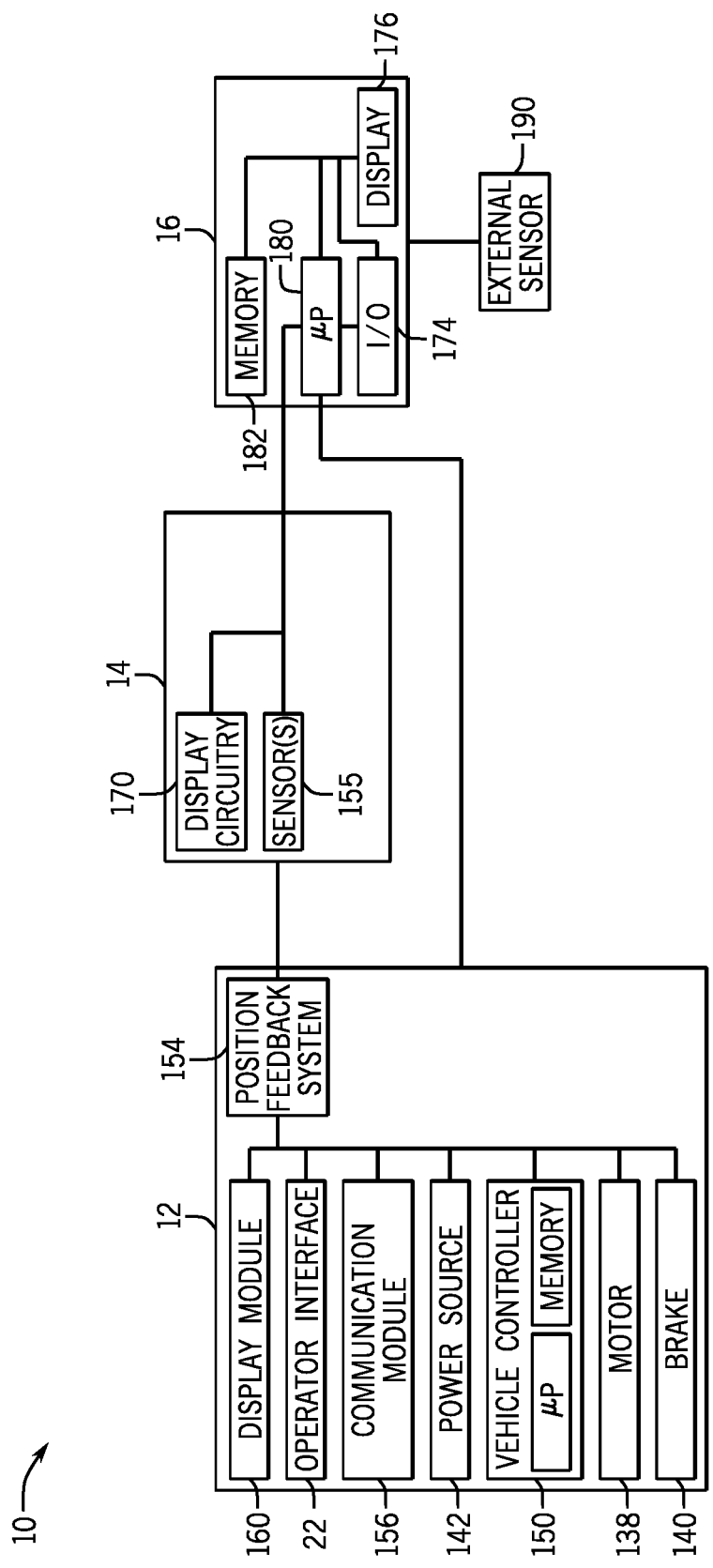

FIG. 6 a flow diagram of a method for controlling vehicle interaction with one another in accordance with present techniques;

FIG. 7 shows a transition between different game configurations on an interactive game floor in accordance with present techniques;

FIG. 8 is a flow diagram of a method for changing a displayed configuration on a game floor in accordance with present techniques; and FIG. 9 is a block diagram of an interactive game floor system in accordance with present techniques.

DETAILED DESCRIPTION

The present disclosure provides an interactive game floor system including one or more ride vehicles configured to move on a game floor. The game floor or game surface forms a game display that the vehicles interact with by moving in a path that intersects with (i.e., positions the vehicle over) certain displayed images. In one embodiment, driving over an image earns points for a vehicle based on the score associated with the image. Each vehicle includes a vehicle controller configured to control movement of the vehicle on the game floor according to input from the vehicle rider. In this manner, the vehicle rider controls the vehicle path and may interact with the game floor according to a desired game experience. Further, in a game with multiple vehicles, the game vehicles may interact with one another. For example, the game vehicles may bump into one another or block the path of another vehicle to prevent particular game actions. Information about the vehicle movement relative to the floor as well as the bumping and blocking activities may be provided to a game controller to assign scores for individual vehicles or a team of vehicles. For example, bumping into another vehicle may earn points for the initiator of the bumping. In another embodiment, the bumping may be unscored, but the bumping may prevent an opponent's vehicle from increasing its own score.

The game controller, which may include one or more automation controls, e.g., programmable logic controller (PLC), is connected to and controls operations of certain components of the system. For example, the game controller controls the display of images or videos on the game floor. In addition, the game controller is also configured to control certain aspect of individual vehicle motion for any vehicle in the game. In one embodiment, based on vehicle position information (e.g., position, velocity, and/or direction of travel) for each of a plurality of game vehicles, the game controller may slow vehicles down to lower speeds in advance of a bump event or may even prevent an actual bump event. In addition, the game controller may designate certain areas of the game floor as being excluded from possible vehicle paths. In such embodiments, even if a vehicle rider provides input to direct the vehicle path onto an excluded area, the game controller overrides the instruction from the rider and prevents the vehicle from driving onto an excluded area. Further, the boundary controls may be overridden based on certain game tasks or goals being achieved, such as when a certain type of player bumps (i.e., "captures") another type of player. In such an instance, the captured player may be returned to a game start point by the most direct path, regardless of any boundaries.

In accordance with the present disclosure, the system controller may update or change a game configuration, either under game operator control or based on the skill or performance of the vehicle riders. Because the game floor displays the game features according to a selected configuration, a new configuration may be selected with different boundaries, paths, interactive elements, and/or penalties. This permits a game floor to be reconfigured at will without moving physical game components. That is, in certain embodiments, the game floor may be implemented as a relatively smooth surface. For example, in the case where game boundaries are defined via display, stopping the display removes the boundaries and allows reconfiguration of permitted vehicle paths as a new display is selected. Accordingly, the interactive game floor system facilitates flexibility in selecting an appropriate game based on a desired type of game and the skill and number of the players.

The disclosed game floor system may be implemented with amusement park attractions including shows, rides, promotions, and so forth. By employing the game floor system in conjunction with particular themes, such as traditional video games, guests are incentivized to visit the amusement park and are further enabled to enjoy the thematic experience provided by the amusement park. Further, because the interactive game floor system is flexible, one game arena may be configured to host games having a number of different themes.

Figure 1:
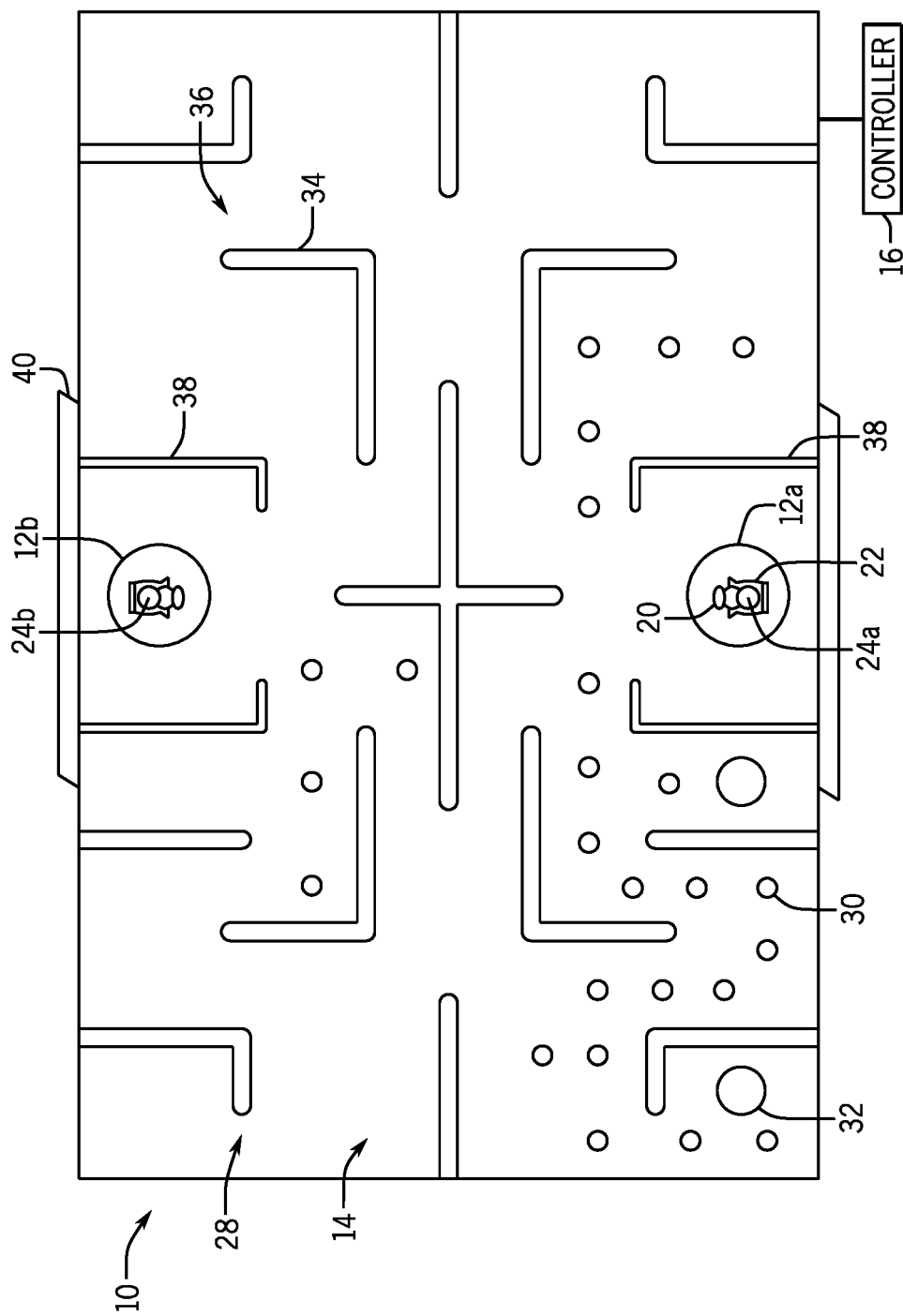
FIG. 1 is a plan view of an amusement park attraction including an interactive game floor in accordance with present techniques.

With the foregoing in mind, FIG. 1 illustrates an embodiment of an interactive game floor system 10 in accordance with the present disclosure. The interactive game floor system 10 can includes one or more game vehicles 12. In the illustrated embodiment, two vehicles 12a and 12b are positioned and configured to move on a game floor 14. The system 10 includes a game controller 16 that is communicatively coupled to the vehicle/s and the game floor 14 and that receives vehicle position information. An operator interface 20 controls vehicle movement and direction on the game floor and may include, for example, a steering wheel, brake and gas pedals, a joystick, a display screen, one or more buttons, etc. The passenger seat 22 may accommodate one or more vehicle riders 24. In certain embodiments, when multiple riders 24 are present in a single vehicle 12, the operator interface 20 may provide split control to both riders. For example, one rider 24 may control rotation or direction of the vehicle 12 while the other rider 24 controls the speed.

The game floor 14 may be configured to display game images and may be a self-illuminated surface. In one embodiment, the game floor 14 is an LCD or LED display surface that is configured to respond to inputs from a vehicle 12. The game floor 14 may be part of an arena or other game location. Further, the game floor 14 may include additional components, such as sensors, that facilitate position tracking of the vehicles 12.

The depicted game floor system 10 includes two vehicles 12a and 12b with respective riders 24a and 24b. Depending on the type of game configuration, the riders 24a and 24b may be competing on opposing teams or may be working together to accomplish a joint goal. For team-based play, the vehicles 12 may be scored individually as well as cumulatively. The game floor 14 has a displayed game configuration 28 that includes interactive elements 30. The interactive elements 30 may also include one or more bonus elements 32 that may or may not be displayed with a different image relative to the other interactive elements 30. The interactive elements may be displayed with any size, shape, or color, depending on theme of the game. For example, for a pirate-themed game, the interactive elements 30 may be displayed as treasure items, such as gold or jewels. There may be any number of interactive elements 30, depending on the game goals. The game floor 14 may also include additional displayed elements that are not interactive but that contribute to the overall theme or aesthetic effect of the game.

The depicted game configuration 28 also includes boundaries 34, such as boundaries defining a maze with a permitted vehicle path area 36. In one embodiment, the boundaries 34 are displayed in a different color than other game elements to permit easy identification by the riders 24. As noted, the boundaries 34 are not physical boundaries and are displayed images on the game floor 14. However, in certain embodiments, the system 10 may include physical components, including physical representations of items or characters that are part of particular games or physical boundaries. The vehicles 12 are prevented from driving on or over the boundaries 34 by one or more of a vehicle control or a game control system, as provided herein. The system 10 may also includes a game start area 38, which is adjacent to a rider loading area 40 for each vehicle 12 in the illustrated embodiment.

In operation, the game system (e.g., the game system 10 of FIG. 1) starts the game and the riders 24 drive their vehicles 12 onto the game floor 14. While FIG. 1 depicts a two-player game, it should be understood that the techniques disclosed herein may be applied to games with one or more vehicles 12. As each rider 24 operates his respective vehicle 12 on the game floor 14, their score may be determined based on the vehicle interaction with the game floor 14 and the path of the vehicle 12 with the allotted game time.

Figure 2:
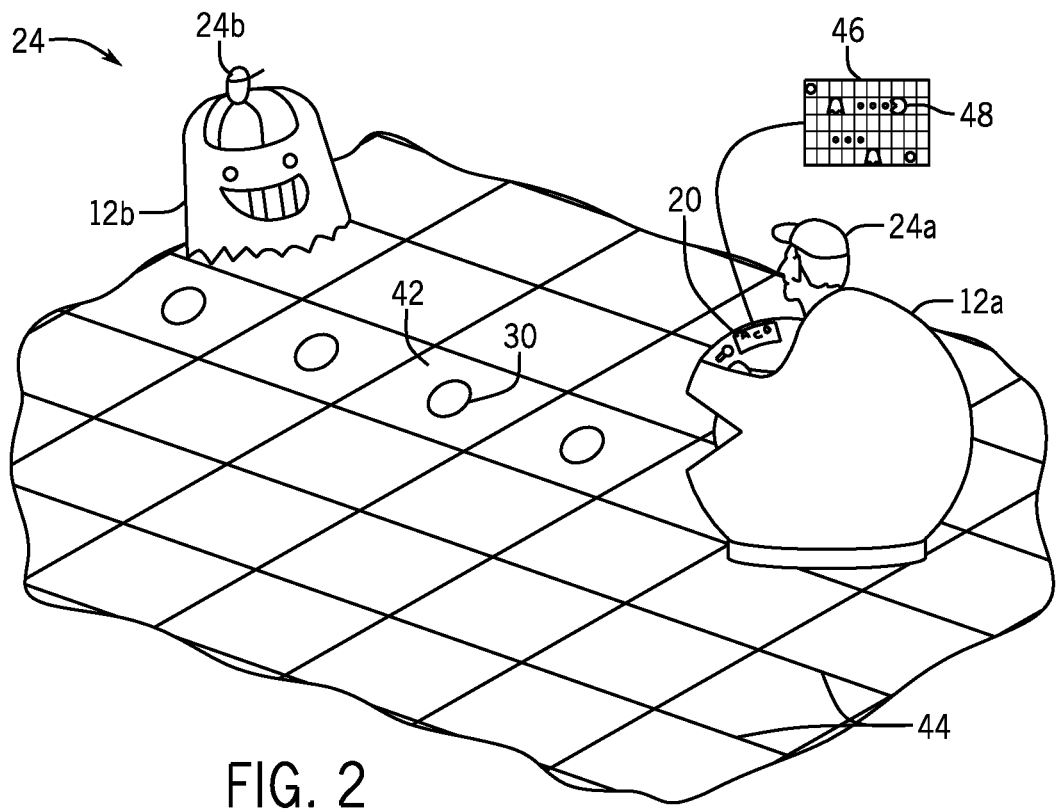
FIG. 2 is a perspective view of a vehicle on an interactive game floor in accordance with present techniques.
Figure 3:
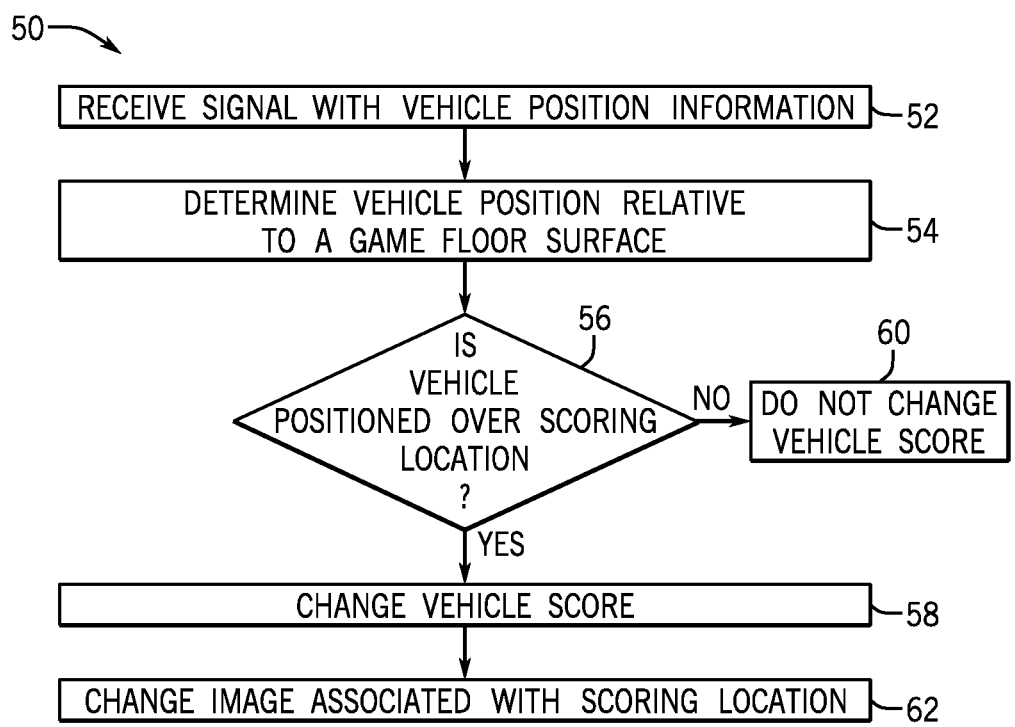
FIG. 3 is a flow diagram of vehicle interaction with an interactive game floor in accordance with present techniques.

FIG. 2 is a perspective view of the vehicles 12a and 12b and their respective riders 24a and 24b. The riders 24 drive their vehicles 12 along the floor 14 to particular areas 42 (which, for example, may be defined by grid lines 42 that may or may not be displayed on the floor 14) associated with interactive elements 30 are displayed. Once the vehicle 12 drives over the interactive element 30, it changes (e.g., changes color) or disappears from the floor display to indicate a point collection. The operator interface 20 may include a display screen 46 for reproducing the real-time interactive floor display, and may also include displayed avatars 48 for each vehicle 12. Based on the desired type of game, the vehicles 12 may be configured to resemble particular theme characters from popular games, video games, movies, or TV shows., in one example FIG. 3 is a flow diagram of a method 50 of assigning scores to one or more riders 24 based on their vehicle paths during game play. The method 50 may be performed entirely or in part by a game floor controller as provided herein using control logic or programming (e.g., via controller 16). At block 52, a controller receives one or more signals with vehicle position information. The position information may be absolute position in space, from which a position relative to the game floor 14 is determined or may include relative position information, e.g., a position of a vehicle 12 relative to the game floor 14, provided by sensing components associated with the game floor 14 or by a camera-based detection system. After a vehicle position relative to the game floor 14 is determined at step 52, the method 50 determines if the vehicle 12 is positioned over a scoring location on the game floor 14. For example, a scoring location may be coincident with the location of any or a certain subset of displayed interactive elements 30. If the vehicle 12 is positioned over the scoring location, a score assigned to the vehicle 12 is updated according to the point value of the scoring location at step 58. In this manner, a vehicle 12 may capture an interactive element 30. If the location is not positioned over a scoring location, the score is unchanged at step 60. The method 50 tracks the progress of the game and the scores of particular vehicles 12 and/or riders 24 by returning to step 52 to process new position information as the vehicles 12 cover the game floor 14 during game play.

The interactive elements 30 may be associated with positive or negative point scores. In addition, the bonus elements 32 may have elevated point scores. Alternatively, a bonus element 32 may permit the vehicle 12 that captured the bonus element 32 (i.e., drove over it), to have special privileges in the game relative to other game players. For example, that vehicle 12 may be permitted to exceed certain speed thresholds relative to other vehicles in the game, change previously-defined roles within the game (e.g., change from prey to predator or vice versa), or enter previously excluded areas of the game floor 14. In one embodiment, the game system 10 may enter a special game round upon capture of a bonus element 32 (or based other performance metrics, such as achieving a particular point score, remaining bump free for a period of time, or bumping a certain number of vehicles) by a vehicle 12. The special game round may include additional displayed effects from the game floor 14 (e.g., flashing boundaries 34 or a change in the color scheme of all elements displayed, including the boundaries 34 and the interactive elements 30) as well as effects on the vehicles 12, such as light effects, a change in vehicle configurations or permissions (e.g., switching all prey cars to predator cars and vice versa, slowing particular game vehicles 12 and/or speeding up other vehicles 12), and special effects or bonus information (e.g., game clues or special messages) displayed on the individual vehicle display screens 46. Upon expiration of the special game round, the game floor 14 may return to the normal configuration.

After an interactive element 30 has been captured by a vehicle 12 (i.e., driven over for the first time in the game), the controller 16 provides instructions to the game floor 14 to change the display at that location. In an example in which the interactive elements 30 are displayed in a particular color, a captured interactive element may be displayed in a different color. Alternatively, a captured interactive element 30 may disappear from the game floor display. In addition to displayed changes, the interactive elements 30 may be configured to assign their associated point score only upon first capture and not to other vehicles that subsequently drive over the location of a captured interactive element 30. However, in certain embodiments, an interactive element 30 may be configured to change into a different type of interactive element 30 upon capture, which may then be captured by another vehicle 12.

Figure 4:
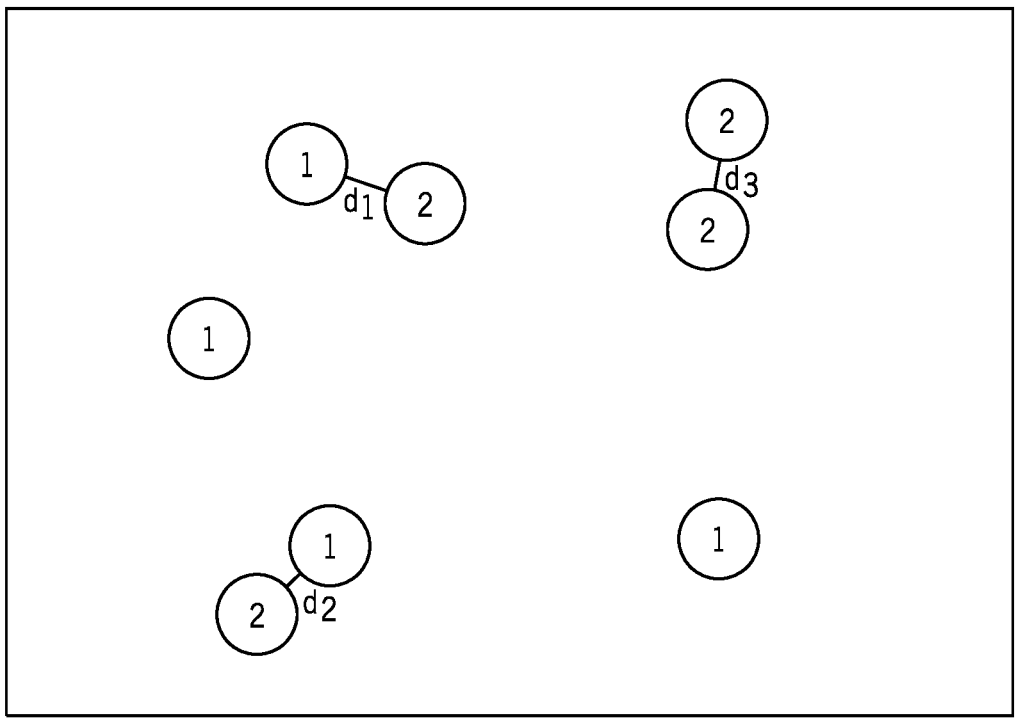
FIG. 4 is a schematic representation of vehicle interaction with one another on an interactive game floor in accordance with present techniques.

In addition to or instead of scoring via interactive elements 30, vehicles that are in a multi-vehicle game may also interact with one another to score points. While the game system 10 may be configured so that individual vehicles 12 are competing against all other vehicles 12 in a traditional bumper cars game, more complex game play is also contemplated. As shown in FIG. 4, a game may be configured so that vehicles of type 1 (marked as 1) are all on a first team and vehicles of type 2 (marked as 2) are all on a second team. One object of the game may be to "bump" into the opposing team's vehicles. A bump may be designated as a distance between two vehicles on opposing teams that is less than a predetermined threshold such that actual physical contact between any two vehicles 12 can be avoided. Vehicles 12 on opposing teams that are a distance $d_1$ that is greater than the threshold from one another may not be considered to be bumped and, therefore, may not experience a change in point total while vehicles that are a distance $d_2$ from one another that is less than the threshold may experience an increase in their point total. Further, the game system 10 may also be configured to distinguish same team bumping (i.e., vehicles from the same team that are a distance $d_3$ apart that is less than the bump threshold). Bumping may also be determined via entry into an impact zone of a vehicle 12. The impact zone may be defined by an imaginary circle around the vehicle 12 with the radius of the bump safe distance, or may be the regions (e.g., in front of and in back of the vehicle 12) on the path that are covered by such circle.

Figure 5:
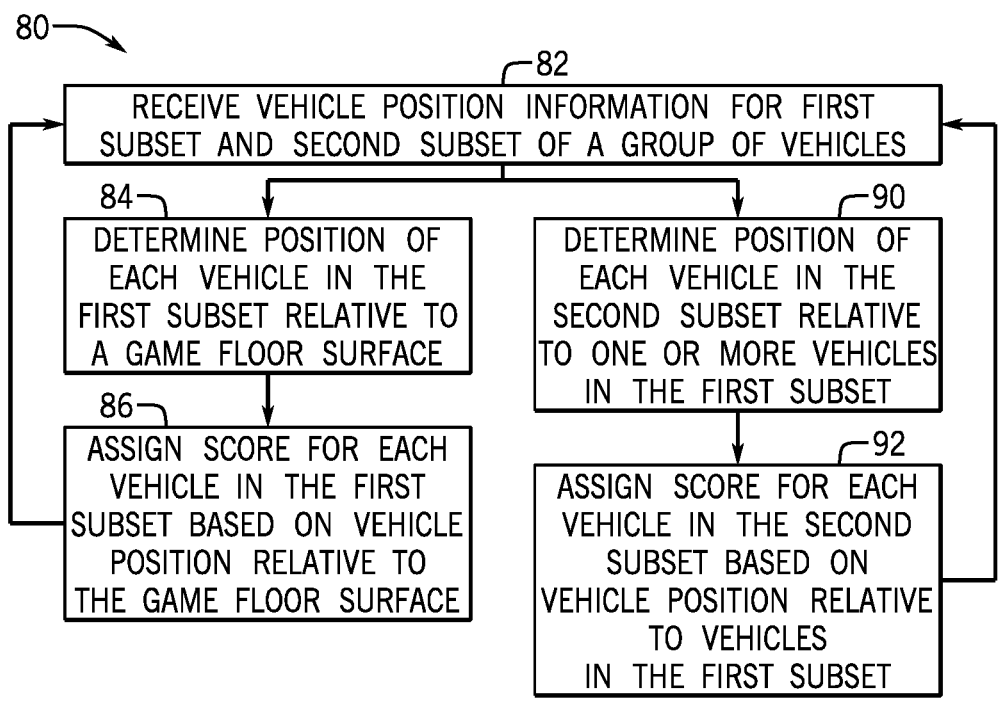
FIG. 5 is a flow diagram of a method for vehicle interaction with an interactive game floor and one another in accordance with present techniques.

In one embodiment, the game may be configured so that certain roles are assigned to certain vehicles 12. For example, in one embodiment, only one team is the bumping team (i.e., the predator team) whose object is to bump the other team (i.e., the prey team), who in turn have a different game goal involving the interactive elements 30. FIG. 5 is a flow diagram of a method 80 of scoring such a game configuration. At step 82, a controller, i.e., a game controller 16, receives position information for a first subset of vehicles corresponding to the prey team and a second subset of vehicles corresponding to the predator team. To score the first subset, the method 80 determines the position of each vehicle in that subset relative to the game floor 14 at step 84 and assigns the score accordingly at step 86. For example, the score for an individual vehicle 12 may be assigned based on whether the position corresponds to an interactive element 30 available for capture. The more interactive elements 30 a particular vehicle 12 passes over (captures), the more points assigned to that vehicle 12 and/or the associated team. The method 80 may determine scores for individual vehicles 12 as well as a team score for the prey team. Scores are updated as the vehicle paths progress over the game floor 14 and the method 80 returns to step 82.

For the predator team, after determining position information at step 90 for each vehicle in the second subset relative to each vehicle in the first subset, the scores are assigned at step 92 based on whether any of the vehicles in the second subset are within the bumping distance threshold. In addition to or instead of being determined by position information, bumping may also be determined by other sensors, such as impact sensors associated with each vehicle 12. Again, the scores update throughout the game as the method returns to step 82 to assess bumping as the vehicles 12 move on the game floor 14.

In one embodiment, the prey team does not receive points or instead receives a penalty for initiating or receiving a bump from any vehicle, including their own teammates. That is, the prey team may only score via the interactive elements 30. Similarly, the predator team may receive a score for bumping only an opposite team member and not a teammate. It is also envisioned that bumps may be unscored, but that the predator team may win by preventing the prey team from achieving a particular score goal. Further, the bumped prey vehicle may have a penalty assessed, such as a point deduction or other penalty (e.g., a frozen vehicle for a certain amount of time, a system override to return the vehicle to the game start or game loading site before the rider can control the vehicle again). By configuring a game for prey and predator teams, the game goals are more complex relative to a simple bumper cars game where any other vehicle is a potential target for bumping. That is, the prey vehicles have the incentive to avoid the predator team to avoid being bumped to in turn achieve higher point totals.

Further, the game system 10 may also mediate vehicle speed on the game floor 14 to allow cars to increase their speed to relatively high levels so long as no other vehicle is within a threshold distance. In this manner, the vehicle speed variability may be greater relative to traditional bumper cars games. The system 10 may also control vehicle speed when vehicles 12 are close to one another, regardless of any team designation. FIG. 6 is flow diagram of a method 100 of controlling vehicle speed in the game. Using the vehicle position information received at step 102, the controller determines if any two vehicles 12 are within a predetermined distance of one another at step 104 and provides override instructions to slow the vehicle speed for any two vehicles 12 too close to one another at step 106. While the vehicles 12 may bump into one another, the bump is controlled. Alternatively, the controller may provide instruction to control the speed and position of two vehicles 12 involved in a potential bump so that the actual vehicles 12 are prevented from impact. However, both vehicles may simulate the feel of an impact with additional vehicle features (e.g., vibration, impact sounds, jerking motion, etc.) that are controlled via the game controller or the vehicle controller. Such an embodiment may prevent impact wear to the vehicles 12.

By providing certain features of the game via the game floor 14, the system 10 may be reconfigured by changing the displayed images. FIG. 7 is an example of a single vehicle 12 configuration 110 on a game floor 14 that transitions to a multi-vehicle 12 configuration 112, with different boundaries 34 and interactive elements 30. In some embodiments, additional vehicles 12 or participants may be virtually presented on the floor 14 or physical vehicles 12 may be activated and controlled by the controller 16 and/or by player-controlled remote controllers. As shown in the flow diagram of FIG. 8, the method 120 of configuring and reconfiguring the game floor 14 may include a step 122 of accessing a first game display having a first configuration from a set of stored game configurations and displaying the first game display on a game floor surface at step 124. After the first game configuration is played and the game information is received at step 126, the first game display is cleared at step 128 upon operator instructions to change the game display or based on the game information. For example, if the players achieve a certain score, the system accesses a second game display having a second game configuration at step 130 and displays the second game display at step 132.

In another embodiment, the game display may be selected based on the number of riders 24 and corresponding vehicles 12 and/or the skill of the game players. For example, an amusement park may track player progress over the course of park visits in various games, e.g., via a card or mobile device. When a player or group of players returns to a game, the game controller 16 may select a game display based on previously played games. In this manner, a single game location is capable of providing challenges for more experienced players as well as novice players. Further, for games played with a mix of player skill levels, the game controller 16 may introduce additional challenges for more advanced players.

As shown in FIG. 9, which is a block diagram of the system 10, the techniques disclosed herein may be used in conjunction with one or more components of the system 10, including the vehicle 12, the game floor 14, and the game controller 16. To provide movements of the vehicle 12, the vehicle 12 includes a motor 138 and a brake 140. The movements of the vehicle 12 may include running (e.g., acceleration, deceleration), turning, and stopping of the vehicle 12. The motor 138 may be powered by any suitable power source 142, including, but not limited to, a battery, a solar panel, an electrical generator, a gas engine, or any combination thereof. The operations of the motor 138 and the brake 140 may be controlled by the vehicle controller 150. For example, the vehicle controller 150 may control the motor 138 to adjust its output power to accelerate or decelerate the vehicle 12. The vehicle controller 150 may also control the brake 140 to decelerate or stop the vehicle 12. Further, the vehicle controller 150 may operate under instructions from the rider via the operator interface 20 (e.g., to steer the vehicle based on operator control of a steering wheel or joystick) or from the game controller 16, which may override rider instructions.

The vehicle 12 may include a position tracking system 154 for monitoring its position on the game floor 14. In one embodiment, the position tracking system 154 interacts with sensors 155 in the game floor 14. Each sensor 155 represents a unique location (e.g., coordinates relative to one or more reference points) on the floor 14. In such an embodiment, the vehicle position tracking system 154 includes a reader that may sense the sensor 155 to provide the position information of the vehicle 12. The reader then supplies the position information to the vehicle controller 154, which in turn provides the information to the game controller 16. The vehicle 12 may include a communication module 156 to facilitate communication with the game controller 16. Based on feedback from the game controller 16, the vehicle 12 may also display game information via a display module 160 coupled to a display screen (e.g., display screen 46 in FIG. 2). Game information may include a vehicle score as well as a team score, a representation of the game floor 14 (e.g., a 2D dynamic graphical display including the current game configuration and vehicle positions on the game floor 14 as well as any available interactive elements 30).

The game controller 16 and the vehicle controller 150 may include various components that may allow for interaction with the vehicle 12 and the display circuitry 170 of the game floor 14. While these elements are discussed in the context of the game controller 16, it should be understood that the vehicle controller 150 and the game floor 14 may include similar components. The vehicle controller 16 may include a distributed control system (DCS) or any computer-based workstation including an input/output interface 174 and a display 176 and that is fully or partially automated. For example, the vehicle controller 16 may be any device employing a general purpose or an application-specific processor 180. The vehicle controller 16 may also include a memory device 182 for storing instructions executable by the processor 38 to perform the methods and control actions described herein for the vehicle 12. The processor 180 may include one or more processing devices, and the memory 182 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 180 or by any general purpose or special purpose computer or other machine with a processor. In addition, the game controller 16 may be configured to communicate over wired or wireless communication paths with the game floor 14 and the vehicle 12.

In one embodiment, data is transferred between the game controller 16, the game floor 14, and the vehicle controller 150 at least in part via a wireless network. The vehicle controller 150 may transfer data indicative of the status of the vehicle to the game controller 16. Such data may include a vehicle identifier for an individual vehicle 12 and associated position, velocity, impact zone, traveling direction, motor output power, loading condition, or the like. Based on the received data from the vehicle controller 150, the game controller 16 may send instructions to the vehicle controller 150 to control the movement of the vehicle 12. For example, the game controller 16 may compare the impact zones of all ride vehicles in the course to determine if any of the two ride vehicles have collided based on their traveling velocities, current positions on the game floor 14, and traveling directions. If so, the game controller 16 may, for example, update a game score and control vehicle speed. In accordance with the present disclosure, the game controller 16 may control each of a plurality of ride vehicles independently.

The system 10 may determine vehicle position via the position tracking system 154 that interacts with sensors 155 on or in the game floor 14 or other suitable techniques for determining vehicle position. For example, the system 10 may include an external sensor 190, such as a camera, that tracks the positions of the vehicles 12 and provides data to the game controller 16. In addition, the vehicle 12 may include transmitters, such as RFID transmitters, that provide signals to the game controller 16 and that may be used to determine position information. Further, while the disclosed embodiments have been described in the context of vehicles 12, in other embodiments, the game players may interact directly with the game floor 14. In such an embodiment, game players may wear watches or other objects that can incorporate position indicating devices. Alternatively, player location may be determined via the external sensor 190.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. A system, comprising:
a plurality of vehicles;
a surface configured to display a plurality of changing images and support the plurality of vehicles; and
a controller configured to:
assign a first set of game rules to a first subset of the plurality of vehicles, the first set of game rules being associated with a first role in a game, wherein the first subset is configured to accumulate a first score according to the first set of game rules; and
assign a second set of game rules to a second subset of the plurality of vehicles, the second set of game rules being associated with a second role in the game, wherein the second subset is configured to accumulate a second score according to the second set of game rules, and wherein the second set of game rules are different than the first set of game rules, wherein the second score is accumulated based on whether a position of one or more vehicles of the second subset overlaps with an image of the plurality of changing images displayed by the surface.

2. The system of claim 1, wherein the controller is configured to activate first special effects associated with the first role and second special effects associated with the second role, wherein the first special effects are different from the second special effects.

3. The system of claim 2, wherein the first special effects and the second special effects comprise vehicle light effects.

4. The system of claim 1, wherein the controller is configured to at least provide instructions to increase a speed of one or more vehicles of the first subset according to the first set of game rules or to provide instructions to decrease a speed of one or more vehicles of the second subset according to the second set of game rules.

5. The system of claim 1, wherein the first role comprises a predator role and the second role comprises a prey role.

6. The system of claim 5, wherein the first score is accumulated based on a position of one or more vehicles of the first subset relative to one or more vehicles of the second subset.

7. A method, comprising:
assigning a first role to a first subset of a plurality of vehicles, wherein the first role is associated with a first set of game rules, and wherein the first role is associated with first vehicle special effects;
assigning a second role to a second subset of the plurality of vehicles, wherein the second role is associated with a second set of game rules, wherein the second role is associated with second vehicle special effects, and wherein the first set of game rules and the second set of game rules are different; and
switching the first role and the second role such that the first role is assigned to the second subset and the second role is assigned to the first subset, wherein switching the first role and the second role comprises switching the first vehicle special effects and the second vehicle special effects.

8. The method of claim 7, wherein switching the first role and the second role is triggered by a vehicle within the first subset acquiring a bonus according to the first set of game rules.

9. The method of claim 8, further comprising displaying a plurality of interactive elements via a game floor, wherein the plurality of interactive elements comprise a bonus element, and wherein acquiring the bonus comprises determining that the vehicle of the first subset has occupied a position on the game floor corresponding to the bonus element.

10. The method of claim 8, wherein acquiring the bonus comprises the vehicle of the first subset achieving a particular point score according to the first set of game rules.

11. The method of claim 8, wherein acquiring the bonus comprises the vehicle of the first subset bumping a certain number of other vehicles of the second subset of the plurality of vehicles according to the first set of game rules.

12. The method of claim 8, wherein acquiring the bonus comprises the vehicle of the first subset remaining bump-free from other vehicles of the second subset of the plurality of vehicles for a period of time.

13. The method of claim 7, wherein the first vehicle special effects comprise first vehicle lighting effects, first vehicle speed thresholds, first vehicle display information displayed via respective vehicle displays of the plurality of vehicles, or any combination thereof, and wherein the second special effects comprise second vehicle lighting effects, second vehicle speed thresholds, second vehicle display information displayed via the respective vehicle displays of the plurality of vehicles, or any combination thereof.

14. A system comprising:
a surface configured to display a plurality of images related to a first game;
a first vehicle configured to move along a vehicle path on the surface; and
a controller configured to:
determine that the first vehicle has moved over a first image of the plurality of images while on the vehicle path; and
provide instructions to display circuitry associated with the surface to change the first image when the first vehicle has moved over the first image while on the vehicle path.

15. The system of claim 14, wherein the surface is configured to display a second plurality of images related to a second game.

16. The system of claim 14, wherein the first vehicle is configured to accommodate multiple riders, and wherein the first vehicle is configured to provide split control of the first vehicle to the multiple riders.

* * * * *